United States Patent [19]
Yu

[11] Patent Number: 4,846,860
[45] Date of Patent: Jul. 11, 1989

[54] AIR CLEANER

[75] Inventor: Mason K. Yu, Birmingham, Mich.

[73] Assignee: General Motors Corporation, Detroit, Mich.

[21] Appl. No.: 232,052

[22] Filed: Aug. 15, 1988

[51] Int. Cl.[4] ............................................. B01D 50/00
[52] U.S. Cl. ........................................ 55/337; 55/498; 55/510; 55/452; 123/198 E
[58] Field of Search .................. 55/337, 498, 510, 452; 123/198 E

[56] References Cited
U.S. PATENT DOCUMENTS
3,696,591 10/1972 Bennett et al. ........................ 55/337
3,923,481 12/1975 Farrow ................................. 55/510

Primary Examiner—Bernard Nozick
Attorney, Agent, or Firm—R. L. Phillips

[57] ABSTRACT

An air cleaner having a tangentially directed inlet, a converging flow path about the unfiltered side of the air filter and a plurality of openings in the sidewall of the air cleaner housing for expelling heavier than air particles.

6 Claims, 3 Drawing Sheets

AIR CLEANER

TECHNICAL FIELD

This invention relates to air cleaners and more particularly to those in which the unfiltered air is passed through a toroidal-shaped air filter.

BACKGROUND OF THE INVENTION

In air cleaners such as used on internal combustion engines, there is typically a housing with a radially arranged snorkel through which unfiltered air is received and circulating about a toroidal-shaped air filter cartridge as shown in FIG. 1 of the accompanying drawing. The air filter is normally mounted in the housing between the inlet and the outlet and is spaced from the interior of the housing so as to define therewith an annular passage extending about the filter for delivering the unfiltered air from the inlet completely about the upstream side of the filter. Because of the radial inlet and the normally uniform cross section of the flow area about the filter, there results a non-uniform mass flow distribution as shown in FIG. 2 of the accompanying drawing whereas the ideal distribution would be uniform about the filter as shown by the dash line in this figure. Because of such non-uniform distribution, there is non-uniform or disproportionate use of the filter which reduces its effectiveness. Moreover, there results a disproportionate buildup of the majority of the dirt particles on the inlet and backside of the filter that can significantly shorten the useful life of the filter particularly the useful life of the filter particularly in those areas where there is a high degree of airborne foreign particles.

SUMMARY OF THE INVENTION

The present invention provides for a cost-effective solution to this problem by providing a tangentially directed inlet or snorkel and forming the sidewall of the housing opposite the upstream side of the filter cartridge so as to cooperatively define with the latter an annular passage about the filter having a cross sectional flow area that converges in the direction of air flow from the inlet so as to establish a cyclone effect with a substantially uniform distribution of air flow to the entire upstream side of the filter. Then in addition, there are formed slots in the housing sidewall that are spaced along the length thereof and angled in the direction of the cycloidal air flow. As a result, those foreign particles heavier than air are forced outwardly by the cyclone effect out through the slots and never reach the filter. Preferably, the filter cartridge is retained as a conventional hollow right circular cylinder configuration, the contour of the housing sidewall is formed to provide this desired effect according to a certain spiral equation defined later and the slots have either a uniform or tapering cross section.

It is an object of the present invention to provide an air cleaner having uniform air distribution substantially free of heavier than air particles to the filter therein.

Another object is to provide in an air cleaner a tangentially arranged inlet and a housing with a perforated sidewall that cooperatively defines with an air filter an annular passage whose cross-sectional area converges in the direction of air flow from the inlet about the filter and is effective to expel heavier than air particles out through openings in the sidewall prior to reaching the filter.

Another object is to provide in an air cleaner, a toroidal filter to whose upstream side there is provided uniform flow distribution as effected by a tangentially arranged inlet and a converting flow path with a slotted sidewall that is determined according to a certain spiral equation such as to provide uniform mass flow to the entire upstream side of the filter and wherein there is produced a cyclone effect that operates to force heavier than air particles out through slots in the sidewall prior to reaching the filter.

These and other objects, advantages and features of the present invention will become more apparent from the following description and drawing in which.

Figure 1:
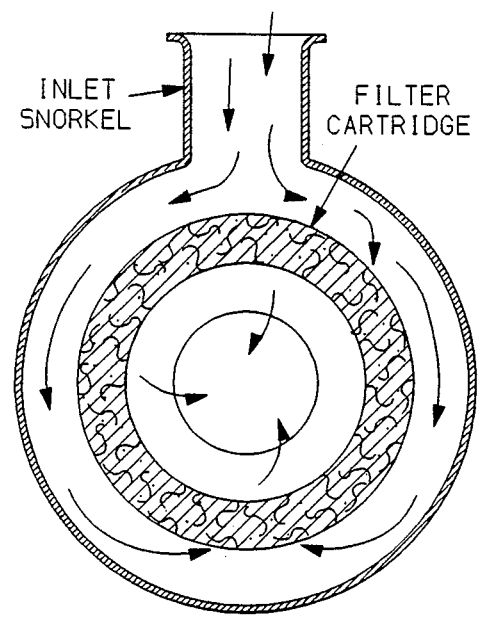
FIG. 1 is a diagrammatic top view of a conventional prior art air cleaner.
Figure 2:
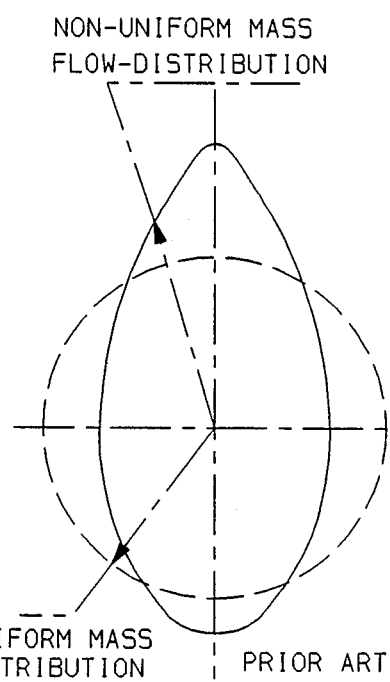
FIG. 2 is a polar plot of the flow distribution in the air cleaner in FIG. 1.
Figure 3:
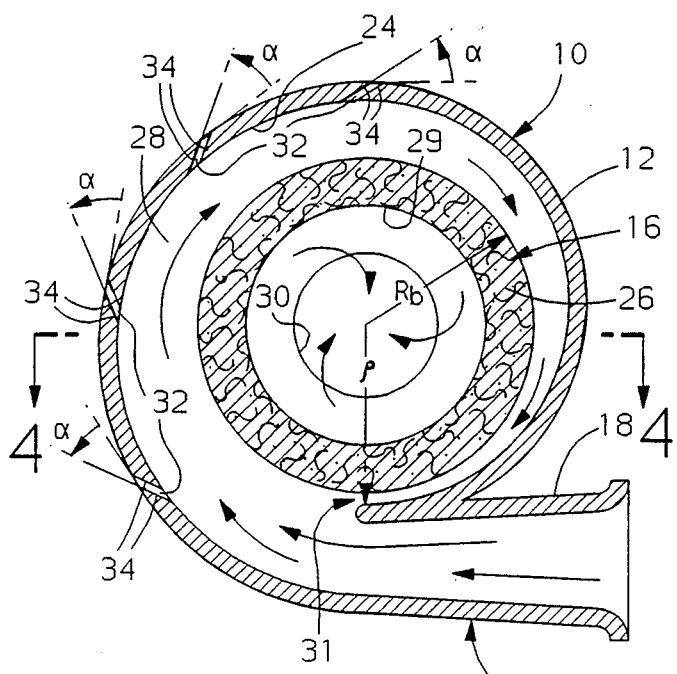
FIG. 3 is a top view in section of an air cleaner constructed according to the present invention.
Figure 4:
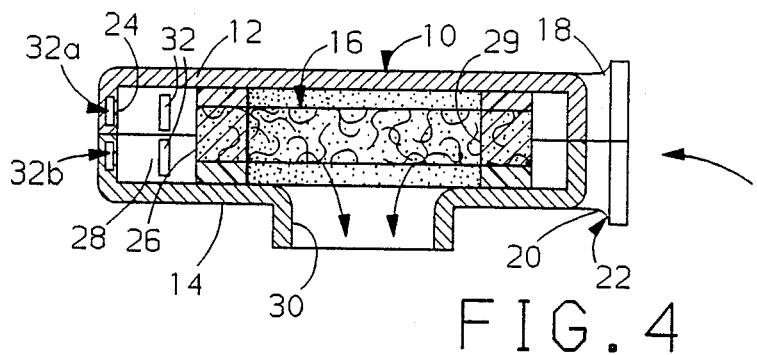
FIG. 4 is a view taken along the line 4—4 in FIG. 3.

Referring to FIGS. 3 and 4, there is seen an air cleaner 10 according to the present invention as adapted for use on the internal combustion engine (not shown) of a motor vehicle. The air cleaner 10 comprises an upper half 12 and a lower half 14 which are generally pan-shaped and cooperatively enclose a conventional filter cartridge 16 sandwiched therebetween at assembly. The two housing halves 12 and 14 have integrally formed extensions 18 and 20 respectively which extend from the main body of the housing, and cooperatively define an air inlet snorkel 22 that extends tangentially to the housing as seen in FIG. 3. The circumferential side wall 24 of the housing the unfiltered or outer side 26 of the filter and the downwardly and upwardly facing (oppositely facing) sides of the halves 12 and 14 cooperatively define an annular passage 28 extending from the inlet completely about the filter. And the interior or filtered side 29 of the filter is connected with the engine by a central opening 30 in the lower housing part.

Figure 5:
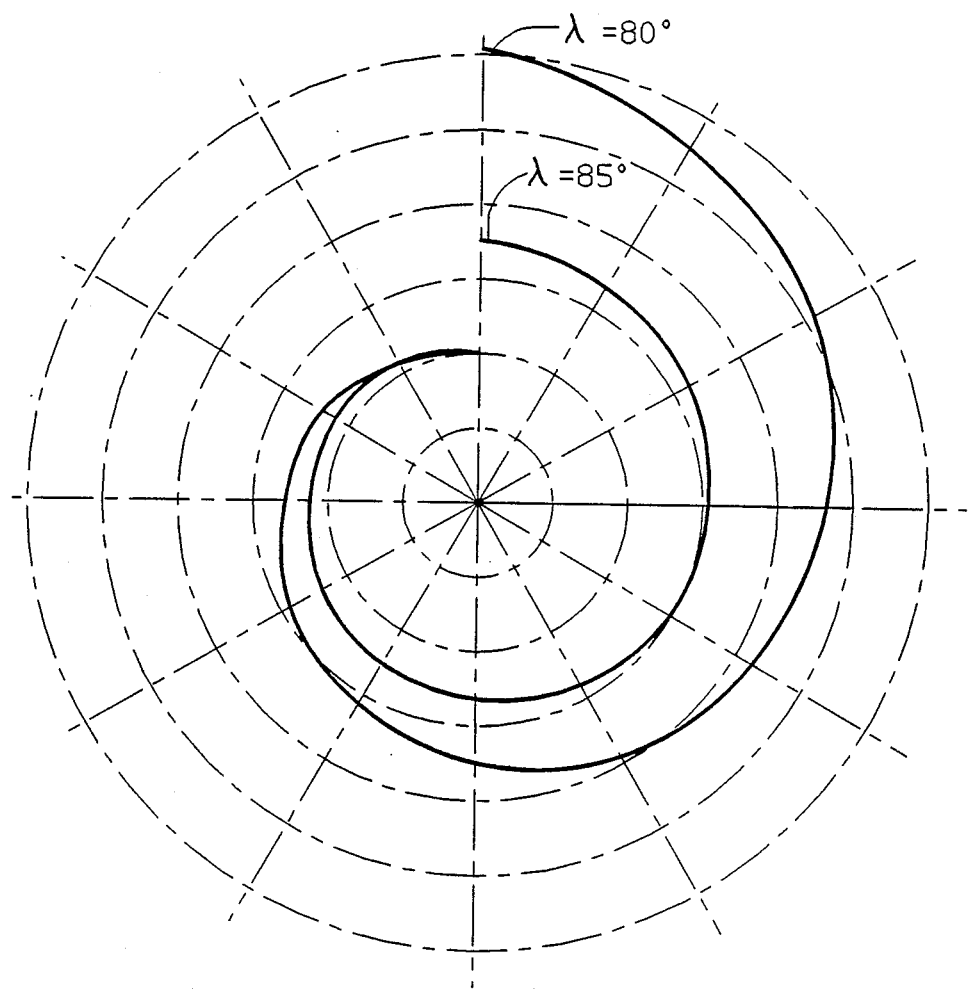
FIG. 5 are polar plots of the spiral equation for the housing side wall in FIGS. 3 and 4 at two different input design angles.
Figure 6:
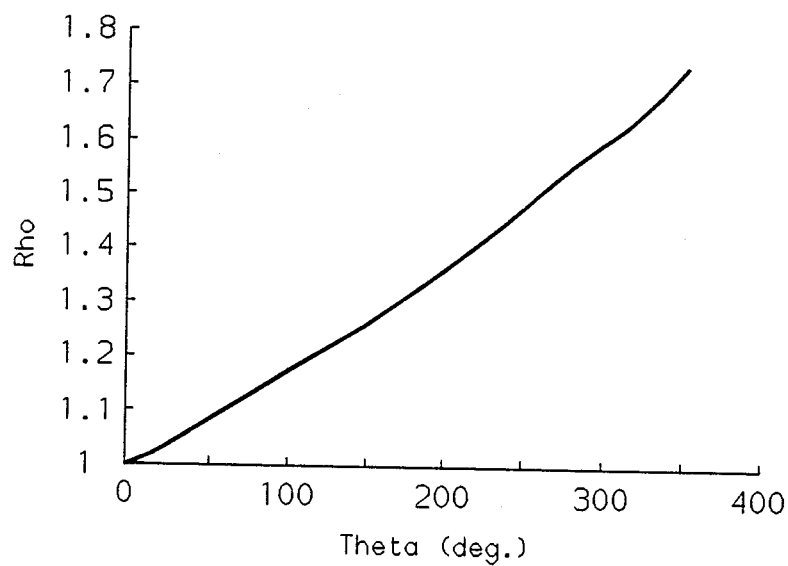
FIGS. 6 and 7 are the X-Y plots of the parameters Rho vs. Theta used in the plots in FIG. 5.
Figure 7:
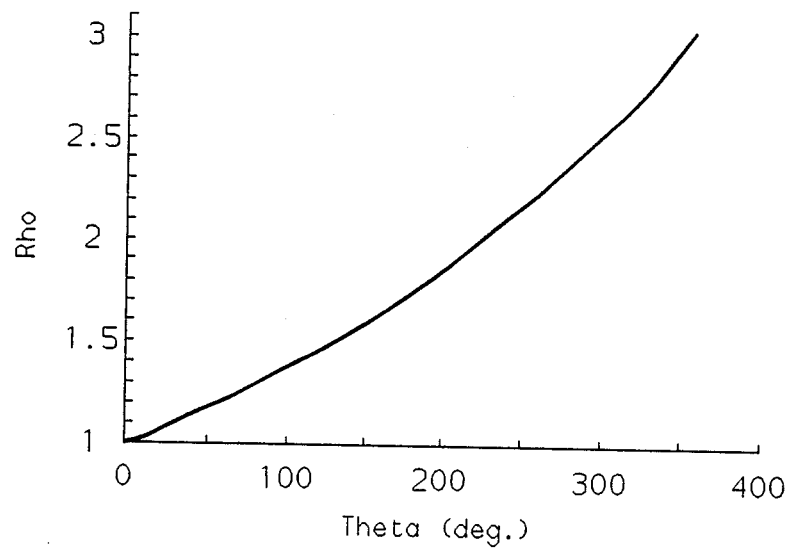

Preferably, the air filter cartridge 16 remains a conventional hollow right circular cylindrical shape with an outer radius $R_b$ at its unfiltered side 26 but the oppositely facing side wall 24 of the housing is formed with a radial dimension according to the equation:

$$\rho = R_b e^{\cot \lambda \cdot \theta}$$

where with reference to FIG. 5
 $\rho$ = radial dimension of wall 24
 $\theta$ = parametric polar phase angle
 $R_b$ = outer radius of filter 16 plus a finite clearance gap 31 (see FIG. 3)
 $\lambda$ = constant-takeoff angle from starting point
 $e$ = base of natural log So instead of the annular passage 28 normally having a uniform cross-sectional flow area along its length, it now converges in the direction of air flow from the air inlet snorkel 22 spirally about the unfiltered or inlet side of the filter in the direction indicated by the arrows in FIG. 3. The rate of air passage convergence is related to the angle Lamba (λ) so that the tangential velocity is constant throughout and by investigation, it has been determined that such should be $80° \leq \lambda \leq 90°$. Illustrative X-Y plots showing the substantially linear relationship between Rho (ρ) and Theta (θ) where Lamba (λ)=85° is shown in FIG. 6. FIG. 7 on the other hand shows more divergence occurs at λ=80°. Below the latter angle it was found that the divergence increases significantly. Within the range λ=80°-90°, there is provided the desired uniform distribution of air flow to the entire area of the upstream side of the filter thereby making uniform and thus improve use of the air filter's capacity.

Figure 3A:
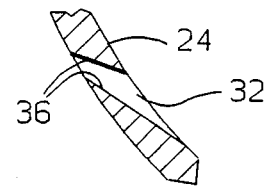
FIG. 3A is a view after the manner of FIG. 3 of another embodiment of the slots.
Figure 3B:
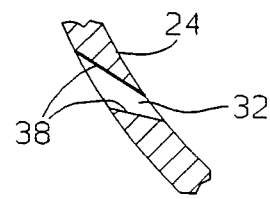
FIG. 3B is a view like FIG. 3A of still another embodiment of the slots.

In addition to the improved mass flow distribution, a plurality of slots or elongated openings 32 are formed in the housing sidewall 24. The slots 32 are spaced along the length of the passage 28 as seen in FIG. 3 and are arranged in two parallel rows 32A and 32B as seen in FIG. 4 so as to substantially span the height of the sidewall. Moreover, the slots 32 are slanted at an acute angle α to a line tangent to the housing sidewall at the respective slots as seen in FIG. 3. The slots 32 are slanted in the direction of the air flow to permit air to pass out but not in and therefore the slant angle α will be referred to as a forward angle. Furthermore, the slots 32 may have a uniform or constant cross section with parallel sides 34 as shown in FIG. 3 or may have a varying cross section with converging walls 36 as shown in FIG. 3A or diverging walls 38 as shown in FIG. 3B.

With all the above slot embodiments, any heavier than air particles such as dirt and sand are flung outward by centrifugal force as a result of the converging spiral passage induced cyclone effect and are mainly caught by the slots 32 and expelled out of the air cleaner housing. As a result, these particles never reach and get into the filter and the useful life thereof is substantially extended.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. In an air cleaner having a housing with an inlet and an outlet, and a toroidal-shaped air filter mounted in said housing between said inlet and outlet and spaced from a sidewall of the housing so as to define therewith an annular passage extending about the filter for delivering air from the inlet to an upstream side of the filter, the improvement comprising said inlet being arranged tangentially to the housing, said sidewall and said upstream side of said filter being formed to cooperatively define said annular passage with a cross sectional flow area that converges in the direction of air flow from said inlet and about said filter so as to establish a substantially uniform distribution of air flow to the entire area of said upstream side of said filter, and a plurality of openings in and spaced along said sidewall for expelling any heavier than air particles out of the housing to prevent their reaching the filter.

2. In an air cleaner having a housing with an inlet and an outlet and an air filter of hollow right circular cylindrical shape mounted in said housing between said inlet and outlet and spaced from a sidewall of the housing so as to define therewith an annular passage extending about the filter for delivering air from the inlet to an upstream side of the filter, the improvement comprising said inlet being arranged tangentially to the housing, said sidewall and said upstream side of said filter formed to cooperatively define said annular passage with a cross sectional flow area that conveges in the direction of air flow from said inlet and about said filter so as to establish a substantially uniform distribution of air flow to the entire area of said upstream side of said filter, and a plurality of openings in and spaced along said sidewall for expelling any heavier than air particles out of the housing to prevent their reaching the filter.

3. In an air cleaner having a housing with an inlet and an outlet and an air filter of hollow right circular cylindrical shape mounted in said housing between said inlet and outlet and spaced from a sidewall of the housing so as to define therewith an passage extending about the filter for delivering air from the inlet to an upstream side of the filter, the improvement comprising said inlet being arranged tangentially to the housing, said sidewalls and said upstream side of said filter formed to cooperatively define said annular passage with a cross sectional flow area that converges in the direction of air flow from said inlet and about said filter so as to establish a substantially uniform distribution of air flow to the entire area of said upstream side of said filter, a plurality of slots in and spaced along said sidewall for expelling any heavier than air particles out of the housing to prevent their reaching the filter, said slots being slanted in the direction of air flow through said passage at an acute angle to a line tangent to said sidewall at the respective slots, said sidewall having a radial dimension ρ according the equation $$\rho = R_b e^{Cot\lambda \cdot \theta}$$

where θ=parametric polar phase angle related to the center of said filter $R_b$=radius of said upstream side of said filter plus a finite clearance gap

λ=80°-90° e=base of natural log

4. An air cleaner as defined in claim 3 further characterized by said slots having a uniform cross section.

5. An air cleaner as defined in claim 3 further characterized by said slots having a converging cross section.

6. An air cleaner as defined in claim 3 further characterized by said slots having a diverging cross section.

* * * * *